United States Patent Office 3,320,227
Patented May 16, 1967

3,320,227
CATALYST FOR THE POLYMERIZATION OF OLEFINS CONSISTING OF TIN OR LEAD TETRAHYDROCARBYLS, A TRANSITION METAL HALIDE, A HALIDE OF A METAL SELECTED FROM THE THIRD AND FIFTH GROUPS AND AN ETHER
Félix Bloyaert and Henri Toussaint, Brussels, Belgium, assignors to Solvay & Cie., Societe en commandite, a simple of the Kingdom of Belgium
No Drawing. Filed July 1, 1963, Ser. No. 292,069
Claims priority, application Belgium, Oct. 22, 1962, 623,911
8 Claims. (Cl. 260—94.9)

The present invention relates to a process for polymerization and copolymerization of olefins in the presence of improved catalysts. In one aspect, the invention relates to improved polymerization catalysts and their preparation.

It is known to polymerize and copolymerize olefins in the presence of a ternary catalyst obtained from (a) a metal, a hydride or an organometallic compound of a metal of the fourth, fifth and sixth groups of the Periodic Table [1]; (b) an inorganic compound of a polyvalent metal having at least three valencies; and (c) a halide of an element from the third and fifth groups of the Periodic Table (Belgian Patent 547,618).

Ingredients (a) include the tetraalkyls and tetraaryls of tin and of lead, especially those containing up to 40 carbon atoms per molecule, e.g., tetraethyl lead, tetrapropyl lead, tetrabutyl lead, tetraphenyl lead, tetranaphthyl lead, and the corresponding compounds of tin. The tin tetraalkyls produce especially active catalysts.

Ingredients (b) include the mineral acid salts of titanium, vanadium, chromium, molybdenum, and tungsten, the halides of titanium being frequently used.

Ingredients (c) include the halides of aluminum, of antimony, and of boron. Especially suitable are aluminum trichloride, antimony pentachloride, and boron trifluoride.

The present invention relates to improvements in processes utilizing the aforedescribed catalytic systems and particularly the application of these systems to the polymerization of lower olefins having from 2 to 4 atoms in their carbon chains.

An object of this invention is to provide an improved polymerization process. Another object is to provide an improved catalyst. A further object is to increase the yield of polymer in a process for the polymerization of olefins. An additional object is to produce a polymer having a modified molecular weight distribution. Another object is to minimize the formation of deposits in a polymerization reactor. Other objects and advantages will become apparent to those skilled in the art upon reading this disclosure.

The improvements according to this invention comprise conducting the polymerization of olefins in contact with a ternary catalyst obtained by commingling (a) a metal, a hydride, or an organometal compound of a metal of the fourth, fifth, and sixth groups of the Periodic Table, (b) an inorganic compound of a polyvalent metal having at least three valencies and (c) a halide of an element selected from the third and fifth groups, and in the presence of small quantities of an ether.

[1] Lange, N. A., "Handbook of Chemistry," 4th ed., 1941, Sandusky, Ohio, Handbook Publishers, Inc., pages 18 and 19.

It is well known to add to catalyst systems, often designated by the name "Ziegler catalysts," small quantities of ethers. This addition results in reducing more or less markedly the catalyst activity (Belgian Patent 563,418) and in increasing appreciably the molecular weight of the polymer obtained in the presence of such catalysts (Belgian Patents 554,242 and 559,727). The addition of larger amounts of ethers is completely deleterious to these catalysts.

Applicant's have found that, apparently because of the specific nature of the ternary catalyst, one obtains a result which is quite different from that just described, i.e. one obtains an appreciable decrease in the molecular weight of the polymer, and an appreciable increase in the activity of the catalyst in many cases, by adding, to the hereinbefore defined ternary catalyst, effective quantities of ethers.

The beneficial effects of the addition of ethers are several. In addition to the increase in catalyst activity and the reduction of molecular weight of the polymer, one obtains a diminution in the amount of low molecular weight polymer and particularly in the amount of low molecular weight polymer which is soluble in the polymerization diluent. One also obtains a narrowing or contraction of the molecular weight distribution and a decrease in the amount of deposits in the polymerization reactor.

The increase in activity of the catalyst, resulting from the addition of ether, allows one to reduce the amount of catalyst utilized to produce a given amount of polymer and thus to decrease manufacturing costs.

Reduction in molecular weight of the polymer is sometimes necessary to obtain products having properties which facilitate their use. This result is also obtained by contraction in molecular weight distribution.

The favorable influence of the addition of ethers on the combination of polymerization conditions is apparently due to the presence of ether oxygen groups in the molecules of the adjuvants. This effect is common to all compounds containing this group and occurs in the case of aliphatic, heterocyclic, and aromatic ethers. The effects obtained with different types of ether are somewhat different, however, and vary with the length of the carbon chains attached to the oxygen atom.

Very small quantities of the ethers in the polymerization mixture produce appreciable effects. Thus, in accordance with current practice of this invention, the polymerization can be conducted in the presence of from 0.1 to 5, preferably 0.5 to 3, gram moles of ether per gram atom of polyvalent metal present in the catalyst system.

The addition of the ethers necessary for the improvement of polymerization conditions and polymer properties can be effected during the preparation of the catalyst, prior to its introduction into the reactor. On the other hand, the additive can be added directly into the polymerization reactor in admixture with a diluent or in any other manner which will insure its presence in the polymerization medium.

The examples which follow further illustrate the invention without being intended to limit the same unduly.

As a control run, ethylene is polymerized in the presence of a ternary catalyst formed by mixing titanium tetrachloride, tin tetra-normal-butyl and aluminum trichloride. In an autoclave, one dilutes to one liter, by addition of pure dry hexane, a catalyst suspension prepared by heating, at 25° C., for 52 minutes, 173 milligrams of titanium tetrachloride, 666 milligrams of tin tetra-normal-butyl, 230 milligrams of aluminum chloride, and 3.8 cc. of normal hexane. The autoclave is heated to 80° C. and ethylene is introduced at a pressure of 10 atmospheres absolute and a charge rate of 120 grams per hour. After two hours of polymerization, the reaction is terminated. The polyethylene obtained is washed, dried and examined. Its molecular weight based on viscosity is 38,000 and its melt viscosity at 250° C. is 4200 poises. During the polymerization, the average activity of the catalyst was 0.531 gram of polymer per hour per atmosphere of ethylene and per milligram of activated titanium.

The foregoing run was subsequently repeated under identical conditions except that, to the polymerization medium, there were added different amounts of di-normal-butyl ether, of tetrahydrofuran, and of anisole. The results appear in the following tabulation:

matic ethers having up to 12 carbon atoms per molecule, and thus modifying the molecular weight distribution of the polymer obtained.

2. A process which comprises polymerizing ethylene in the presence of a catalyst which forms on commingling titanium tetrachloride, tetra-butyl-tin and aluminum chloride and adding to the polymerization mixture prior to termination of the polymerization, from 0.1 to 5 gram moles of di-n-butyl-ether per gram atom of titanium.

3. A process which comprises polymerizing ethylene in the presence of a catalyst which forms on commingling titanium tetrachloride, tetra-butyl-tin and aluminum chloride and adding to the reaction mixture from 0.1 to 5 moles of tetrahydrofuran per gram mol of titanium.

4. A process which comprises polymerizing ethylene in the presence of a catalyst which forms on commingling titanium tetrachloride, tetra-butyl-tin and aluminum chloride and adding to the reaction mixture from 0.1 to 5 gram moles of anisole per gram atom of titanium.

TABLE

| | Run No. | | | | | |
|---|---|---|---|---|---|---|
| | 1 | 2 | 3 | 4 | 5 | 6 |
| Additive | None | Dibutylether | Dibutylether | Dibutylether | Tetrahydrofuran | Anisole |
| Milligrams Adjuvant per Liter Hexane | | 47 | 94 | 188 | 112 | 6 |
| Mol Ratio Ether to Total Titanium | | 0.4 | 0.8 | 1.6 | 1.6 | 1 |
| Specific Catalyst Activity, Grams Polyethylene per Hour Atmosphere Milligram Activated Titanium | 0.531 | 0.728 | 1.065 | 1.487 | 0.438 | 0.627 |
| Relative Activity, Percent | [1] 100 | 137 | 202 | 230 | 82.5 | 118 |
| Molecular Weight, Based on Viscosity | 38,000 | 37,000 | 36,000 | 35,000 | 29,000 | 34,000 |
| Melt Viscosity at 250° C., Poises | 3,900 | | | 3,200 | | |
| Dry Residue from the Hexane: | | | | | | |
| Grams per Kilogram Hexane | 4.81 | | | 2.64 | 1.46 | 1.63 |
| Grams per Kilogram of Polyethylene precipitated | 17.6 | 19.5 | 17.5 | 11.1 | 6.11 | 6.5 |
| Deposits on Wall, grams Polyethylene per Kilogram Total Polyethylene | 25 | 2 | None | None | None | None |
| Factor $K_D^2$ | 19 | | | 15.7 | | |

[1] Control.
[2] The factor $K_D$, determined by rheological tests, is related to the ratio $M_N/M_W$ and provides a picture of the molecular weight distribution. A diminution of this factor indicates a narrowing of the molecular weight distribution.

From the results shown in the preceding tabulation it can be seen that the addition of 0.4 gram mole of ether per gram atom of titanium markedly increases the activity of the catalyst and markedly reduces deposits on the walls of the reactor. A judicious choice of the ether and the amount thereof to be used is necessary to decrease greatly the molecular weight of polyethylene. Thus cyclic ethers of the type of tetrahydrofuran are particularly indicated when one desires to obtain a polymer having a markedly decreased molecular weight. Other ethers, notably the aliphatic ethers, should be used when one especially desires to increase catalyst activity. The use of all kinds of ethers provides, in every case, a marked diminution of the fraction of low molecular weight polymer soluble in cyclohexane, an improvement in heat exchange between the reactor and the coolant, and the total suppression of reactor deposit formation.

We claim:

1. In a process for the polymerization of olefins having from 2 to 4 carbon atoms in the presence of a catalyst obtained by commingling (a) a material selected from the group consisting of tetraalkyls of tin, tetraaryls of tin, tetraalkyls of lead and tetraaryls of lead containing up to 40 carbon atoms per molecule, (b) a halide of a metal selected from the group consisting of titanium, vanadium, chromium, molybdenum and tungsten, and (c) a halide of an element selected from the group consisting of aluminum, antimony and boron, wherein all valences of said element are satisfied by halogen, the improvement which comprises conducting the polymerization in the presence of a minor amount of an ether, selected from the group consisting of saturated aliphatic, saturated cyclic and aromatic ethers having up to 12 carbon atoms per molecule, and thus modifying the molecular weight distribution of the polymer obtained.

5. An improved polymerization catalyst formed by adding to the catalyst which results from commingling (a) a material selected from the group consisting of tetraalkyls of tin, tetraaryls of tin, tetraalkyls of lead and tetraaryls of lead containing up to 40 carbon atoms per molecule, (b) a halide of a metal selected from the group consisting of titanium, vanadium, chromium, molybdenum and tungsten, (c) a halide of a metal selected from the group consisting of aluminum, antimony and boron wherein all valences of said metal are satisfied by halogen, and (d) from 0.1 to 5 gram moles of an ether per gram atom of said polyvalent metal, said ether being selected from the group consisting of saturated aliphatic, saturated heterocyclic and aromatic ethers having up to 12 carbon atoms per molecule.

6. A catalyst which forms on commingling titanium tetrachloride, tetra-normal-butyl tin, aluminum chloride, and di-normal-butyl ether, the titanium chloride, tetra-butyl-tin, and aluminum chloride being present in proportions to produce an active olefin polymerization catalyst in the absence of said ether, and said ether being added in an amount from 0.1 to 5 gram moles per gram atom of titanium.

7. A catalyst which forms on commingling titanium tetrachloride, tetra-normal-butyl tin, aluminum chloride, and tetrahydrofuran, the titanium chloride, tetra-butyl-tin, and aluminum chloride being present in proportions to produce an active olefin polymerization catalyst in the absence of said tetrahydrofuran and said tetrahydrofuran being added in an amount from 0.1 to 5 gram moles per gram atom of titanium.

8. A catalyst which forms on commingling titanium tetrachloride, tetra-normal-butyl tin, aluminum chloride, and anisole, the titanium chloride, tetra-butyl-tin, and aluminum chloride being present in proportions to produce an active olefin polymerization catalyst in the absence of said anisole and said anisole being added in an amount from 0.1 to 5 gram moles per gram atom of titanium.

References Cited by the Examiner
UNITED STATES PATENTS
3,116,274  12/1963  Boehm _____ 260—94.9

FOREIGN PATENTS
225,764   11/1959  Australia.
564,772   10/1958  Belgium.
851,113   10/1960  Great Britain.

JOSEPH L. SCHOFER, *Primary Examiner.*

M. B. KURTZMAN, *Assistant Examiner.*